April 25, 1961  R. A. WARREN ET AL  2,981,782
TERMINAL-DEPOLARIZER UNIT FOR PRIMARY CELLS
Filed June 26, 1958

Inventors,
Robert A. Warren
and Milton E. Wilke,
By: Jones, Darbo & Robertson,
Attys.

United States Patent Office 2,981,782
Patented Apr. 25, 1961

2,981,782
TERMINAL-DEPOLARIZER UNIT FOR PRIMARY CELLS

Robert A. Warren and Milton E. Wilke, Freeport, Ill., assignors, by mesne assignments, to Servel, Inc., Evansville, Ind., a corporation of Delaware Filed June 26, 1958, Ser. No. 744,772

16 Claims. (Cl. 136—136)

This invention relates to primary cells and is particularly concerned with a method for forming terminal-depolarizer units or assemblies wherein the depolarizer is adherent to the terminal and in good electrical contact therewith, and to the products resulting from the practice of the method.

Alkaline primary cells, especially those containing mercuric oxide depolarizers, have very desirable properties among the most useful of which is high capacity per unit volume. Such cells are generally comprised of an amalgamated zinc anode, a mercuric oxide cathode compressed into a metallic cup-form terminal, an alkaline electrolyte substantially immobilized in an absorbent separator such as Webril, and a metallic container for the cell.

Because mercuric oxide itself has poor electrical conductivity, a conductive material such as graphite is generally dispersed thereinto in preparing the cathode composition, and the mixture compressed into the terminal cup under very high pressure. The depolarizer mix has low apparent density coupled with high compressibility, and consequently it is not feasible to introduce sufficient material into the terminal cup in one charge to form a sufficiently large depolarizer cathode. As a result, a compressed depolarizer pellet is first formed outside the terminal cup and subsequently inserted thereinto. However, if the compressed cathode pellet is merely placed in the cup, sufficiently good electrical contact is not adequately assured. A method to overcome this difficulty has been advanced which comprises first compressing the depolarizer mix outside the cup to form a pellet, placing the pellet in the cup and then recompressing the pellet into the cup. This method is objectionable in several respects, however. When the pellet is compressed into the cup, a small amount of the depolarizer material is caused to be extruded up the sides. This extruded material must be removed prior to cell assembly. Another objection is that expensive equipment is required for the latter compression step, adding considerably to the cost of manufacture of the cells.

It is an object of the present invention to provide a method for inserting a depolarizer pellet into a terminal member and causing it to be adherently retained therein without danger of distortion or crushing of the pellet.

It is a further object of the invention to provide a depolarizer terminal assembly for an alkaline cell, and a method for the construction of the assembly which does not require expensive equipment.

It is still further an object to provide a terminal-depolarizer assembly wherein the depolarizer is engaged with the terminal by means of a strongly adherent bond, and wherein good electrical conduction is provided between said cathode and said terminal.

Other objects and improvements of the invention will become apparent from the following description and from the drawings.

According to the present invention, it has been found that a depolarizer-terminal unit or assembly may be provided by first compressing the depolarizer material to form a pellet, and then bonding the pellet to the terminal by means of a flowable electrically conductive adhesive composition comprised for example of a conductive finely divided material in a molten wax binder. The adhesive composition in a flowable state is first interposed at the interface between the pellet and the terminal. The composition is then allowed to cool, causing the pellet and terminal to become firmly bonded to each other by a bond providing good electrical conductivity.

Figure 1:
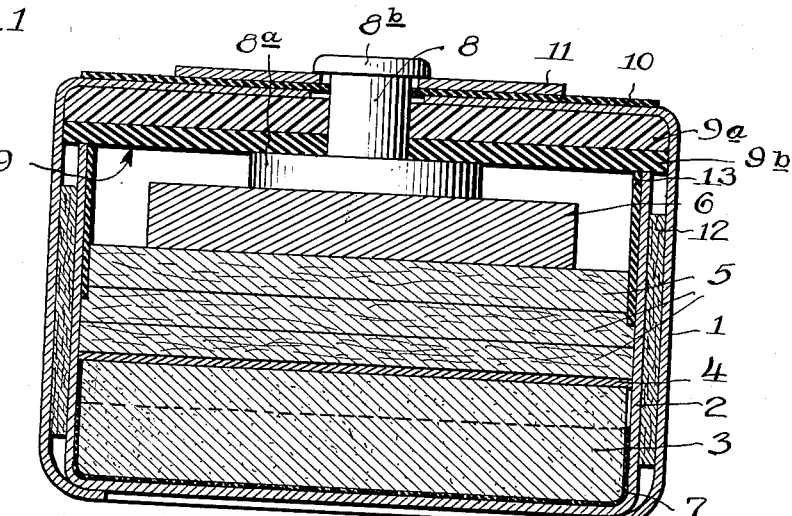
Fig. 1 is a cross-sectional view of an alkaline cell containing a depolarizer-terminal assembly according to the invention.
Figure 2:
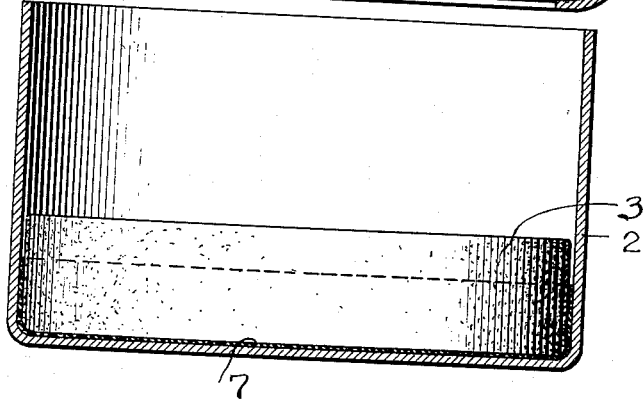
Fig. 2 is a cross-sectional view of the terminal-depolarizer unit.
Figure 3:
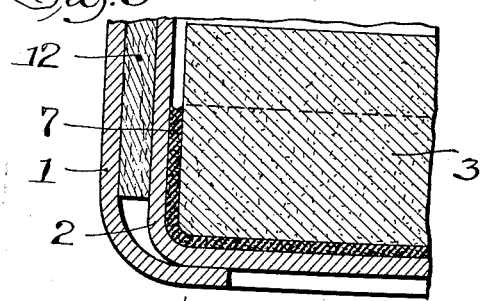
Fig. 3 shows an enlarged fragmental view of a corner of the cell shown in Fig. 1 showing one form of the conductive bond between the depolarizer and the terminal.
Figure 4:
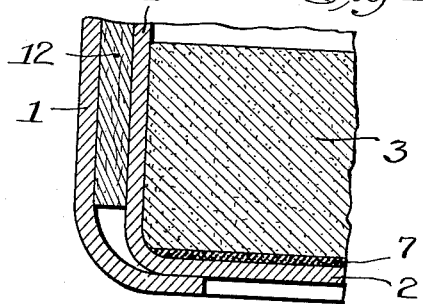
Fig. 4 is an enlarged fragmental view of a corner of a cell similar to that of Fig. 1 showing another form of the conductive bond between the depolarizer and terminal.

In the embodiment shown in Fig. 1, two open-top cups, an outer cup 1 and an inner or positive terminal cup 2, are arranged in nested position oppositely oriented to each other to form the enclosure for the cell. An annular space is provided between the cups. Arranged in stacked relationship within the interior of the inner cup 2 are the active chemical elements of the cell, including the depolarizer pellet 3, a barrier disk 4, an electrolyte-receptive spacer or separator 5, and a zinc anode 6. The depolarizer 3 is held in adherent relationship with the inner cup 2 by means of a layer of the conductive composition of the invention.

Attached to the outer cup 1 by means of a rivet 8 or other equivalent fastening means are the sealing disk 9, an insulating disk 10, and a conductive terminal disk 11. The upset end 8b of the rivet, together with the terminal disk 10, form the negative terminal of the cell. The head 8a of the rivet is maintained in pressure relationship and in electrical contact with the anode 6. Located in the annular space between the inner and outer cup is an electrolyte-absorbent band 12. Within the inner cup 2 and adjacent to the anode 6 and separator 5 may be placed an insulating cylinder 13 to prevent the possible short-circuiting of the cell which might result if the anode were caused to be displaced against the inner can.

The cups 1 and 2 are made of a suitable rigid material such as steel or nickel-plated steel. A .015 inch thick deep-drawing steel has been found to be suitable. This material is sufficiently thick to withstand the gas pressure developed during operation of the cell. The inner cup 2 is of a smaller diameter and is somewhat shorter in height than the outer cup 1. The absorbent cylinder 12 which is placed in the annular space between the cups may be of any suitable absorbent material such as cardboard or paper. The hole provided in the outer cup bottom for the rivet 8 is somewhat larger than the diameter of the rivet shank in order to prevent electrical contact of the rivet, which is part of the negative terminal, with the outer cup, which is in electrical contact with the positive terminal, as such contact would result in the short-circuiting of the cell.

The depolarizer-terminal unit may be assembled in any one of a number of different ways. The conductive composition may be first placed in the terminal and the pellet placed thereover. Heat is then applied to the cup in sufficient amount to melt the wax and render the composition flowable. The heat is removed and the composition allowed to cool and harden. Alternatively, the wax may first be melted in the cup and the pellet inserted, and the composition then cooled. In still another method, molten wax may be placed in the terminal cup, and the pellet placed over the wax composition. The conductive wax may also be melted on the bottom of the pellet, allowed to harden and the pellet placed in the cup. To insure a low resistance bond, pressure should preferably be applied to the pellet to hold it against the terminal cup until the molten composition has hardened. Where adhesives other than wax are used, suitable methods may be used to harden them.

In the preferred form of the invention the pellet should be provided with a somewhat smaller diameter than the diameter of the cup. When the pellet is pressed into the cup, molten wax creeps around the side of the pellet, and provides additional adhesion between the pellet side and the cup side. When the wax is allowed to solidify, the pellet is firmly held in the cup with good electrical contact enhanced by the additional adhesive contact surface between the side of the pellet and the inner side of the can. Where the pellet has the same diameter as the terminal cup, however, the adhesive layer will be limited to the bottom of the cup.

The present conductive adhesive composition comprises an electrically conductive finely divided material dispersed in an adhesive binder such as wax or any other suitable adhesive. The finely divided material must be of such nature that it maintains its surface conductive even though exposed to the corrosive action of the air. One such suitable material is silver powder, since silver oxide formed upon exposure of the particles to air is also a good conductor. A suitable composition comprises silver powder dispersed in a wax, as disclosed in U.S. Patent No. 2,702,757. According to the disclosure contained therein, silver powder which has been preferably rolled in a mill to increase its apparent density, is mixed together with a molten wax such as microcrystalline wax until a uniform composition is attained. The resulting composition is highly conductive, has a relatively low melting point, and has excellent adhesive properties.

Copper powder alone is not a suitable material since the copper oxide formed on the surface upon exposure to air is a poor conductor. However, if copper powder is first plated with silver, as disclosed in U.S. Patent No. 2,771,380, the composition retains its excellent conductivity even when exposed to air. According to the disclosure of this patent, copper powder is first dry mixed with discreet particles of crystalline hydrated sodium sulfate, and the mixture then immersed in an aqueous cyanide silver plating bath. As a result of this process the discreet copper particles acquire an immersion plating of silver upon their surfaces. The silver plated copper powder may then be used in the same manner as the silver particles in the method described above to form the conductive adhesive composition. Other metal powders which may be plated with silver to render their surfaces conductive may also be used. Although similar compositions containing graphite as the conductive material are not nearly as conductive as those containing silver or silver plated metals, they sometimes may be used when a lower order of conductivity is tolerable, such as in the case when the resulting batteries are to be subjected only to a very low current drain.

The depolarizing cathode 3 is composed of a mixture of a powdered oxygen-yielding substance such as mercuric oxide, mercurous oxide, silver oxide, silver peroxide, cuprous oxide, manganese dioxide, nickelous oxide, or other readily reducible oxygen-yielding compounds or mixtures thereof, and a suitable conductive substance such as micronized graphite. The depolarizer pellet is compressed to a thickness preferably about one-third that of the height of the inner can 2.

The barrier disk 4 rests upon the top surface of the depolarizer. It is made of a suitable liquid- and ion-permeable material which is substantially resistant to the action of the electrolyte, such as parchment paper, porous vinyl resin, vinylidene resin, or compressed magnesium oxide or magnesium silicate. The barrier disk prevents particles of the depolorizer, graphite or reduced mercury from migrating through the cell and causing electrical short-circuiting. It preferably has an initial diameter somewhat larger than that of the depolarizer so that it fits tightly in place in the cell.

The electrolyte-receptive separator 5 presses against the barrier disk and is composed of a suitable, porous, absorbent, electrolyte-resistant material such as wood or sorbent, electrolyte-resistant material such as wood or cotton fibers, as for example porous absorbent paper or absorbent cotton. A preferred material is webril, a fibrous cellulose in the form of a pad. In order to have sufficient thickness, the separator may be composed of several pads in stacked relationship. It is maintained under compression between the anode 6 and the barrier disk 4 and contains the major portion of the cell electrolyte absorbed therein. Alternatively, a gelled electrolyte may be used.

The electrolyte is generally an aqueous solution of sodium, potassium, or lithium hydroxide, or a mixture thereof. It may additionally contain dissolved therein an oxide such as zinc oxide or aluminum oxide to inhibit attack by the electrolyte upon the anode during the period when the cell is not in operation.

The anode is composed of an electronegative metal such as zinc. In order that it may have a high surface area and readily absorb the cell electrolyte, it is preferably made by compressing zinc powder into a pellet. Prior to formation of the anode the zinc powder is preferably amalgamated to protect it from the cell electrolyte when the cell is not in operation. The anode is held in pressure contact against the separator by the rivet head 8a.

The rivet 8 is made of any suitable conducting material such as steel which is sufficiently malleable so that its end may be upset. The rivet head preferably has a rather large surface area for engagement with the anode, and also for forming an airtight seal with the sealing disk; it is preferably coated with a metal such as tin, zinc, or nickel to prevent chemical action by the electrolyte thereon.

The sealing disk 9 is composed of a resilient, yieldable material such as neoprene polyethylene, modified polystyrene vinyl plastic vulcanized fiber etc. In a preferred embodiment as illustrated in Figure 1 the sealing disk is of a laminated construction having an upper layer 9a which is less resilient and semi-rigid such as a laminated phenolic resin sheet or melamine resin sheet reinforced with fiber glass and one or more lower layers of resilient material 9b. If only one resilient layer is used, the disk should be arranged so that the resilient layer is in contact with the lip of the inner cup and the rivet head, the semi-rigid disk serving as a backing to impart stiffness. If more than one resilient layer is used, one should be affixed to each surface of the less resilient layer. The sealing disk has a diameter substantially the same as the inside of the outer cup and serves as a closure for the inner cup which contains the active cell materials. It is maintained in pressure contact with the lip of the inner cup when the lip of the outer cup is crimped over the bottom of the inner cup in the assembly of the cell.

The terminal disk or washer 11 may be of a conducting material such as steel or plated steel. The disk 10 serves to insulate the outer cup from the terminal disk.

The negative terminal 11, insulating disk 10 and sealing disk 9 may be assembled as a single unit if desired, as shown.

To produce the terminal-depolarizer unit, predetermined amount of the conductive composition such as finely divided silver in a wax binder is placed in the bottom of the inner cup 2 and the pellet placed over the wax composition. The cup 2 is placed on a heated surface until the molten wax has formed intimate contact with the surface of both the depolarizer pellet and the cup.

The cup is then placed on a cool surface and the wax composition allowed to harden.

The cell is assembled by placing the active chemical cell elements in the inner cup and adding the required amount of electrolyte. The cell is completed by placing the outer cup assembly over the inner cup 2 and the absorbent band 12. Sealing of the cell is accomplished by crimping the lip of the outer cup 1 over the bottom of the inner cup 2. This provides an axial clamping force which compresses the sealing disk against the inner cup lip to maintain a good air-tight seal.

The positive terminal-depolarizer pellet unit produced according to the present invention and the cell containing the unit have several advantages over those constructed according to the art. First, the need for machinery for providing the necessary high compression for compressing the pellet into the cup is obviated. Second, lateral extrusion of the depolarizer mix during the compression step is avoided. Third, the pellet is instantly bonded to the cup by means of the conductive composition, insuring a strongly bonded highly conductive electrical connection.

We claim:

1. A method for the production of a terminal-depolarizer unit for primary cells comprised of a metallic terminal bonded to a preformed compressed depolarizer pellet, said method comprising interposing a molten film of a conductive compositions consisting essentially of an electrically conductive finely divided material in a wax binder at an interface between said terminal and said depolarizer pellet, and cooling said composition to form an adherent conductive bond between said terminal and said pellet without deforming said pellet.

2. A method according to claim 1 wherein said finely divided material is silver.

3. A method according to claim 1 wherein said finely divided material is comprised of copper particles having an adherent silver coating thereon.

4. A method for the production of a terminal-depolarizer unit for primary cells comprised of a metallic cup containing a preformed compressed depolarizer pellet bonded thereto, said method comprising interposing a molten film of an electrically conductive composition consisting essentially of a conductive finely divided metal dispersed in a wax binder at an interface between said cup and said depolarizer pellet, and cooling said composition to form an adherent conductive bond between said cup and said pellet without deforming said pellet.

5. A method for the production of a terminal-depolarizer unit for primary cells comprised of a metallic cup containing a preformed compressed depolarizer pellet bonded thereto, said method comprising providing a molten film of an electrically conductive composition consisting essentially of a conductive finely divided metal in a wax binder in the bottom of said cup, placing said pellet in said cup, and cooling said composition to form an adherent conductive bond between said cup and said pellet without deforming said pellet.

6. A method for the production of a terminal-depolarizer unit for primary cells comprised of a metallic cup containing a preformed compressed depolarizer pellet bonded thereto, said method comprising placing an electrically conductive composition consisting essentially of finely divided metal dispersed in a wax binder in said cup, inserting said depolarizer pellet in said cup over said composition, heating said cup to provide a molten film of said composition at the interface between said cup and said pellet, and cooling said composition to form an adherent conductive bond between said cup and said pellet without deforming said pellet.

7. A terminal-depolarizer unit for primary cells comprising a metallic terminal, a preformed compressed depolarizer pellet, and a film of an electrically conductive composition interposed at the interface and forming an adherent conductive bond between said terminal and said pellet, said composition consisting essentially of a conductive finely divided material in a wax binder.

8. A terminal-depolarizer unit according to claim 7 wherein said conductive adhesive composition consists essentially of a conductive finely divided material in a wax binder.

9. A terminal-depolarizer unit for primary cells comprising a metallic cup, a preformed compressed depolarizer pellet, and a film of an electrically conductive adhesive composition interposed at the interface and forming an adherent conductive bond between said cup and said pellet, said conductive composition consisting essentially of a conductive finely divided material in a wax binder.

10. A terminal-depolarizer unit for primary cells comprising a metallic cup, a preformed compressed depolarizer pellet, and a film of an electrically conductive adhesive composition interposed at the interface forming an adherent conductive bond between said terminal and said pellet, said composition consisting essentially of a conductive finely divided metal in a wax binder.

11. A terminal-depolarizer unit according to claim 10 wherein said finely divided metal is silver.

12. A terminal-depolarizer unit according to claim 10 wherein said finely divided metal comprises a conductive metal having an adherent silver coating thereon.

13. A terminal-depolarizer unit according to claim 10 wherein said finely divided metal comprises copper having an adherent silver coating thereon.

14. In a primary alkaline cell comprising a cell closure having a positive terminal and a negative terminal, active cell elements including an anode, a preformed compressed depolarizer pellet, a non-conductive liquid-absorbent separator, and an alkaline electrolyte contained in said separator, the improvement which comprises a bonded positive terminal-depolarizer unit comprised of said positive terminal, said compressed depolarizer pellet, and a film of an electrically conductive adhesive composition interposed at the interface and forming an adherent conductive bond between said terminal and said pellet, said composition consisting essentially of a conductive finely divided metal in a wax binder.

15. An alkaline primary cell according to claim 14 wherein said finely divided metal is silver.

16. An alkaline primary cell according to claim 14 wherein said finely divided metal comprises copper particles having an adherent coating of silver thereon.

References Cited in the file of this patent

UNITED STATES PATENTS

| | | |
|---|---|---|
| 2,422,046 | Ruben | June 10, 1947 |
| 2,526,101 | West et al. | Oct. 17, 1950 |
| 2,689,877 | Briggs | Sept. 21, 1954 |
| 2,816,153 | Kort | Dec. 10, 1957 |
| 2,829,186 | Kort | Apr. 1, 1958 |
| 2,870,235 | Soltis | Jan. 20, 1959 |